United States Patent

Sano et al.

[11] Patent Number: 5,734,545
[45] Date of Patent: Mar. 31, 1998

[54] MONOLITHIC CERAMIC CAPACITOR

[75] Inventors: Harunobu Sano, Kyoto; Yukio Hamaji, Otsu, both of Japan

[73] Assignee: Murata Manufacturing Co., Ltd., Kyoto, Japan

[21] Appl. No.: 768,505

[22] Filed: Dec. 18, 1996

[30] Foreign Application Priority Data

Dec. 20, 1995 [JP] Japan ................... 7-349733

[51] Int. Cl.$^6$ ............... H01G 4/06; H01G 4/228; H01G 4/20
[52] U.S. Cl. ............ 361/321.4; 361/313; 361/321.5; 361/306.3; 361/309; 361/320
[58] Field of Search ............. 501/32, 134–136, 501/138–139; 361/311–313, 303–305, 306.1, 306.3, 307, 308.1, 309, 320, 321.1, 321.2, 321.3, 321.4, 322

[56] References Cited

U.S. PATENT DOCUMENTS

| | | | |
|---|---|---|---|
| 5,268,342 | 12/1993 | Nishiyama et al. | 501/138 |
| 5,668,694 | 9/1997 | Sato et al. | 361/321.4 |

FOREIGN PATENT DOCUMENTS

| | | |
|---|---|---|
| 722176 | 1/1996 | European Pat. Off. |
| 2264297 | 8/1993 | United Kingdom |

Primary Examiner—Bot L. Ledynh
Attorney, Agent, or Firm—Ostrolenk, Faber, Gerb & Soffen, LLP

[57] ABSTRACT

Disclosed is a monolithic ceramic capacitor comprising dielectric ceramic layers made from a material which comprises an essential component of $(1-\alpha-\beta)\{BaO\}_m \cdot TiO_2 + \alpha Re_2O_3 30 \beta(Mn_{1-x-y}Ni_xCo_y)O$ ($0.0025 \leq \alpha \leq 0.025$; $0.0025 \leq \beta \leq 0.05$; $\beta/\alpha \leq 4$; $0 \leq x < 1.0$; $0 \leq y < 1.0$; $0 \leq x+y < 1.0$; $1.000 < m \leq 1.035$) and from about 0.1 to 3.0 mols, relative to 100 mols of the essential component, of a side component MgO, and contains from about 0.2 to 3.0 parts by weight, relative to 100 parts by weight of said components, of an oxide of the type of $Li_2O$-$B_2O_3$-$(Si,Ti)O_2$. The capacitor is low-priced and can be small-sized, while having large-capacity. It has a dielectric constant of 3000 or more, and has a high insulating resistance of 6000 MΩ·μF or more and 2000 MΩ·μF or more at 2 KV/mm and at room temperature and 125° C., respectively, and 2000 MΩ·μF or more and 500 MΩ·μF or more at 20 KV/mm and at room temperature and 125° C., respectively. It has temperature-dependent capacitance that satisfies the B-level characteristic standard stipulated in the JIS Standard and the X7R-level characteristic standard stipulated in the EIA Standard, and has high reliability irrespective of the presence or absence of plate film covering it.

16 Claims, 3 Drawing Sheets

MONOLITHIC CERAMIC CAPACITOR

FIELD OF THE INVENTION

The present invention relates to monolithic ceramic capacitors to be used in electronic instruments, especially those having inner electrodes made of nickel or nickel alloys.

BACKGROUND OF THE INVENTION

Monolithic ceramic capacitors are generally produced as follows. First, a sheet of a dielectric material having coated thereon an electrode material to be an inner electrode is prepared. For example, the dielectric material may consist essentially of $BaTiO_3$. Next, a plurality of such sheets each coated with the electrode material are laminated and integrated under heat and pressure, and the resulting laminate is baked at from 1250° C. to 1350° C. to obtain a monolithic dielectric ceramic body having inner electrodes therein. To the both ends of the dielectric ceramic body are fixed outer electrodes that electrically communicate with the inner electrodes. Thus is obtained a monolithic ceramic capacitor.

Accordingly, the materials for such inner electrodes must satisfy the following requirements:

(a) Since the dielectric ceramics and the inner electrodes are baked together, the melting point of the materials for the inner electrodes must be not lower than the temperature at which the dielectric ceramics can be baked.

(b) The materials for the inner electrodes must not be oxidized even in high-temperature, oxidizing atmospheres and must not react with dielectrics.

As electrodes that satisfy these requirements, noble metals, such as platinum, gold, palladium and silver, have heretofore been used. However, these electrode material are expensive, although they have excellent characteristics. Accordingly, the cost of the electrode material reaches from 30 to 70% of the total cost of the monolithic ceramic capacitor, which therefore is the essential factor of increasing the production costs of conventional monolithic ceramic capacitors.

Noble metals, known are base metals, such as Ni, Fe, Co, W and Mo, have a high melting point. However, such base metals are easily oxidized in high-temperature, oxidizing atmospheres and lose their ability to function as electrodes. Therefore, if such base metals are used as the inner electrodes in monolithic ceramic capacitors, they must be baked in neutral or reducing atmospheres along with dielectric ceramics. However, conventional dielectric ceramic materials were defective in that if they are baked in such neutral or reducing atmospheres, they are greatly reduced into semiconductors.

In order to overcome these drawbacks, for example, proposed were a dielectric material comprising a solid solution of barium titanate where the ratio of barium sites/titanium sites is over the stoichiometric ratio thereof, such as that disclosed in Japanese Patent Publication No. 57-42588; and a dielectric material comprising a solid solution of barium titanate and containing oxides of rare earth metals, such as La, Nd, Sm and Dy, added thereto, such as that disclosed in Japanese Patent Application Laid-Open No. 61-101459.

Also proposed were a dielectric material having a composition of $BaTiO_3$-$CaZrO_3$-$MnO$-$MgO$, such as that disclosed in Japanese Patent Application No. 62-256422; and a dielectric material having a composition of $BaTiO_3$-$(Mg,Zn,Sr,Ca)O$-$B_2O_3$-$SiO_2$, such as that disclosed in Japanese Patent Publication No. 61-14611.

Using these dielectric materials, dielectric ceramics were obtained which are not converted into semiconductors even when baked in reducing atmospheres. As a result, it has become possible to produce monolithic ceramic capacitors comprising inner electrodes of base metals such as nickel.

With recent developments in electronics, small-sized electronic parts have become in great demand and small-sized, large-capacity, monolithic ceramic capacitors are therefore required. For these reasons, the recent tendency in the art is rapidly toward use of dielectric materials having a higher dielectric constant and toward thinner dielectric layers. Accordingly, there is now a great demand for dielectric materials of high reliability having a high dielectric constant and in which the temperature-dependent variation is small.

However, the dielectric materials disclosed in Japanese Patent Publication No. 57-42588 and Japanese Patent Application Laid-Open No. 61-101459 generally were defective in that the crystals of the dielectric ceramics obtainable from the materials are generally large, though the dielectric ceramics themselves may have a high dielectric constant, with the result that if thin dielectric layers having a thickness of, for example, 10 µm or less are made of such dielectric ceramics and incorporated into monolithic capacitors, the number of crystals in each layer is reduced and therefore the reliability of the monolithic capacitors is lowered. In addition, the dielectric materials were further defective in that the temperature-dependent variation of the dielectric constant of the dielectric ceramics is great. For these reasons, the conventional dielectric materials could not meet the requirements of the market.

On the other hand, the dielectric material disclosed in Japanese Patent Application Laid-Open No. 62-256422 was defective in that $CaZrO_3$ and also $CaTiO_3$ that is formed during the baking step may often form secondary phases together with Mn and others and therefore the reliability of the capacitor comprising the material is problematic, although the dielectric constant of the ceramic body of the material is relatively high, the crystals constituting the ceramic body are small and the temperature-dependent variation in the dielectric constant is small.

The dielectric material disclosed in Japanese Patent Publication No. 61-14611 was defective in that the dielectric constant of the ceramic body of the material is from 2000 to 2800 and therefore the material is not suitable for small-sized, large-capacity monolithic capacitors. In addition, the material was further defective in that it does not satisfy the X7R-level characteristic standard stipulated in the EIA Standard, which indicates that the temperature-dependent variation in the capacitance within the range between −55° C. and +125° C. shall be +/−15%.

In order to solve the above-mentioned problems, proposed were different compositions, for example, in Japanese Patent Application Laid-Open Nos. 05-09066, 05-09067 and 05-09068. However, these compositions could not still satisfy the recent severe requirements for the reliability of capacitors in the market. Therefore, there is still a great demand for dielectric materials with much more improved reliability. In addition, there is also a great demand for thinner dielectric layers with much more improved characteristics for use in monolithic ceramic capacitors. In this connection, if the conventional dielectric layers are thinned while still having the same rated voltage as that of the original unthinned dielectric layers, the reliability of such thinned layers is much lowered. For example, their insulating resistance at room temperature and at high temperatures is lowered, since the electric field strength to be applied to each of such thinned layers is enlarged. For such thinned dielectric layers, therefore, their rated voltage must be lowered. Given the situation, accordingly, it has become necessary to develop thin dielectric layers with high reliability, which are not required to have a lowered rated voltage and which have high insulating resistance in strong electric field conditions.

In order to produce small-sized, large-capacity monolithic ceramic capacitors in an automatic surface-mounting system, the outer electrodes formed by baking an electroconductive metal powder are plated with solder to form a plate film thereon. To form such a plate film, for example, electrolytic plating is generally employed. In general, the outer electrodes formed by baking an electroconductive metal powder often have fine pores therein. Therefore, if monolithic ceramic capacitors are dipped in a plating bath in order to form a plate film over their outer electrodes, the plating liquid penetrates into the fine pores of the baked electrodes, and it will reach the interface between the inner electrode and the dielectric ceramic layer, thereby lowering the reliability of the capacitors.

SUMMARY OF THE INVENTION

Accordingly, the subject matter of the present invention is to provide a low-priced, small-sized, large-capacity, monolithic ceramic capacitor, which has a dielectric constant of 3000 or more, which has a high insulating resistance when measured at 2 KV/mm and at room temperature and 125° C., of 6000 M$\Omega$·μF or more and 2000 M$\Omega$·μF or more, respectively, in terms of its product with the capacitance (the product CR), and still has a high insulating resistance, when measured at 20 KV/mm and at room temperature and 125° C., of 2000 M$\Omega$·βF or more and 500 M$\Omega$·μF or more, respectively, which has temperature-dependent capacitance that satisfies the B-level characteristic standard stipulated in the JIS Standard and the X7R-level characteristic standard stipulated in the EIA Standard, and which has high reliability irrespective of the presence or absence of the plating over it.

Specifically, the present invention provides a monolithic ceramic capacitor composed of a plurality of dielectric ceramic layers, a plurality of inner electrodes formed between the dielectric ceramic layers in such a manner that one end of each inner electrode is exposed out of an end of the dielectric ceramic layers, and outer electrodes electrically connected with the exposed inner electrodes, which is characterized in that the dielectric ceramic layers each are made of a material comprising barium titanate having a content of impurities of about 0.02% by weight or less, and also yttrium oxide, terbium oxide, dysprosium oxide, holmium oxide, erbium oxide, ytterbium oxide, manganese oxide, cobalt oxide and nickel oxide, and containing as a side component, magnesium oxide in an amount of from about 0.1 to 3.0 mols, in terms of MgO, relative to 100 mols of the essential component having the following compositional formula:

$(1-\alpha-\beta)$ {BaO}$_m$·TiO$_2$+$\alpha$Re$_2$O$_3$+$\beta$(Mn$_{1-x-y}$Ni$_x$Co$_y$)O where Re$_2$O$_3$ is one or more selected from Y$_2$O$_3$, Tb$_2$O$_3$, Dy$_2$O$_3$, Ho$_2$O$_3$, Er$_2$O$_3$ and Yb$_2$O$_3$; and $\alpha$, $\beta$, m, x and y are as follows:

$0.0025 \leq \alpha \leq 0.025$ $0.0025 \leq \beta \leq 0.05$ $\beta/\alpha \leq 4$ $0 \leq x < 1.0$ $0 \leq y < 1.0$ $0 \leq x+y < 1.0$ $1.000 < m \leq 1.035$, and further containing from about 0.2 to 3.0 parts by weight, relative to 100 parts by weight of said components, of an oxide of the type of Li$_2$O-B$_2$O$_3$-(Si,Ti)O$_2$; and the inner electrodes are made of nickel or a nickel alloy.

Preferably, the oxide of the type of Li$_2$O-B$_2$O$_3$-(Si,Ti)O$_2$ falls within a compositional range as surrounded by six lines formed by connecting six points, representing mol %, of:

A (0, 20, 80)

B (19, 1, 80)

C (49, 1, 50)

D (45, 50, 5)

E (20, 75, 5)

F (0, 80, 20)

in a triangular diagram of {Li$_2$O, B$_2$O$_3$, (Si$_w$Ti$_{1-w}$)O$_2$}, in which $0.3 \leq w < 1.0$ or more preferably $0.4 \leq w < 0.9$; and the oxide further contains about 20 parts by weight or less, relative to 100 parts by weight of said components, of at least one of Al$_2$O$_3$ and ZrO$_2$, provided that the ZrO$_2$ content is about 10 parts by weight or less.

Also preferably, the outer electrodes each are made of a sintered layer of an electroconductive metal powder or of an electroconductive metal powder with glass frit added thereto. Further preferably, the outer electrodes each are composed of a first, sintered layer of an electroconductive metal powder or of an electroconductive metal powder with glass frit added thereto, and a second, plated layer formed on the first layer.

As the material for the dielectric ceramic layers, herein used is a dielectric ceramic composition comprising barium titanate, and one or more rare earth oxides selected from yttrium oxide, terbium oxide, dysprosium oxide, holmium oxide, erbium oxide and ytterbium oxide, and also manganese oxide, cobalt oxide and nickel oxide, at a specifically conditioned compositional ratio, and containing magnesium oxide and an oxide of the type of Li$_2$O$_3$-B$_2$O$_3$-(Si,Ti)O$_2$. Therefore, even in a reducing atmosphere, the dielectric ceramic composition can be baked well without worsening its characteristics. As a result, it is possible to obtain a high-reliability, monolithic ceramic capacitor having a temperature-dependent capacitance that satisfies the B-level characteristic standard stipulated in the JIS Standard and also the X7R-level characteristic standard stipulated in the EIA Standard, and having high insulating resistance at room temperature and even at high temperatures in strong electric field conditions. In addition, since the crystal grains constituting the sintered ceramic body are small, having grain sizes of about 1 μm or smaller, preferably about 0.75 μm or less, the number of the ceramic crystal grains in each dielectric layer can be increased. Therefore, even when the dielectric layers in the monolithic ceramic capacitor are thinned, the reliability of the capacitor is not lowered.

We, the present inventors, have found that, in the dielectric ceramic composition which is to form the dielectric ceramic layers and which comprises barium titanate, and one or more rare earth oxides selected from yttrium oxide, terbium oxide, dysprosium oxide, holmium oxide, erbium oxide and ytterbium oxide, and also manganese oxide, cobalt oxide and nickel oxide, the content of the impurities in the barium titanate, such as alkaline earth metal oxides, e.g., SrO and CaO; alkali metal oxides, e.g., Na$_2$O and K$_2$O; and other oxides, e.g., Al$_2$O$_3$ and SiO$_2$, especially alkali metal oxides such as Na$_2$O and K$_2$O, has a great influence on the electric characteristics of the capacitors. Specifically, if barium titanate having an alkali metal oxide impurity content of smaller than about 0.02% by weight, preferably less that about 0.15 parts, is in the dielectric ceramic composition, the capacitors obtained may have a dielectric constant of 3000 or higher.

In addition, we, the present inventors, have also found that the addition of an oxide consisting essentially of Li$_2$O-B$_2$O$_3$-(Si,Ti)O$_2$ to the dielectric ceramic composition improves the sinterability of the composition, while also improving the plating resistance of the ceramic layers. Moreover, we have further found that the addition of Al$_2$O$_3$ and ZrO$_2$ to the oxide consisting essentially of Li$_2$O-B$_2$O$_3$-(Si,Ti)O$_2$ increases the insulating resistance of the ceramic layers.

According to the present invention that has the effects mentioned above, therefore, it is possible to realize a high-reliability, small-sized, high-capacity, monolithic ceramic capacitor having inner electrodes of nickel or a nickel alloy, which can be produced in an automatic surface-mounting system and of which the temperature-dependent variation in the capacitance is small.

In the monolithic ceramic capacitor of the present invention, the dielectric ceramic layers are made from a dielectric ceramic composition that can be baked even in a reducing atmosphere without being reduced into semiconductors. Therefore, a base metal of nickel or a nickel alloy can be used as the material for the electrodes in the capacitor. In addition, since the composition can be baked at relatively low temperatures of 1300° C. or lower, the production costs of the capacitor can be reduced.

Moreover, the monolithic ceramic capacitor of the invention that comprises ceramic layers made from such dielectric ceramic composition has a dielectric constant of 3000 or higher, and the temperature-dependent variation in the high dielectric constant of the capacitor is small. Further, the capacitor has high insulating resistance even in strong electric field conditions, and its life time is long even at high temperatures. Therefore, the dielectric layers constituting the capacitor can be thinned well, without lowering the rated voltage of the capacitor. In addition, since the crystals constituting the dielectric layers have grain sizes of 1 μm or smaller, the layers can be thinned well, without reducing the number of the crystals therein, being different from the ceramic layers constituting conventional monolithic ceramic capacitors. Therefore, according to the present invention, it is possible to obtain such a high-reliability, small-sized, large-capacity, monolithic ceramic capacitor. Moreover, since the electric characteristics of the capacitor of the invention are not worsened by plating, the capacitor can be produced in an automatic surface-mounting system.

The above-mentioned objects and other objects of the present invention, and also the characteristics and the advantages thereof will be clarified further more in the detailed description of the preferred modes of carrying out the invention and the examples of the invention, which is made hereinunder with reference to the drawings attached hereto.

PREFERRED MODES OF CARRYING OUT THE INVENTION

Figure 1:
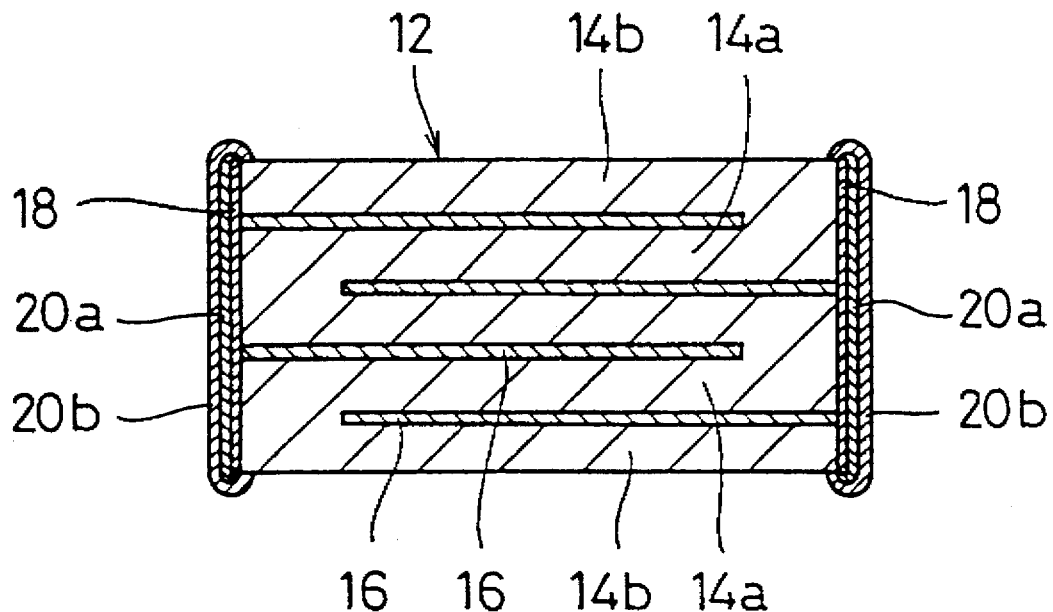
FIG. 1 is a cross-sectional view illustrating one embodiment of the present invention.

FIG. 1 is a cross-sectional view showing one embodiment of the present invention. The monolithic ceramic capacitor 10 illustrated comprises a monolithic dielectric ceramic body 12. The monolithic dielectric ceramic body 12 is formed by integrally laminating a plurality of first dielectric ceramic layers 14a and two second dielectric ceramic layers 14b. In the monolithic dielectric ceramic body 12, the dielectric ceramic layers 14a and 14b are integrally laminated in such a manner that the two dielectric ceramic layers 14b are disposed at the both sides, while sandwiching therebetween a plurality of the first dielectric ceramic layers 14a. These dielectric ceramic layers 14a and 14b are laminated along with inner electrodes 16 embedded therein alternatively extending to opposing surfaces of body 12. On each of the both sides of the monolithic dielectric ceramic body 12, formed are an outer electrode 18, a first plate film 20a and a second plate film 20b in that order. The first plate film 20a may be made of nickel or copper, and the second plate film 20b may be made of solder or tin. Accordingly, the monolithic ceramic capacitor 10 is shaped in the form of a rectangular parallelepiped chip.

Now, a method for producing the monolithic ceramic capacitor 10 of the invention is described below in the order of the steps constituting the method.

Figure 2:
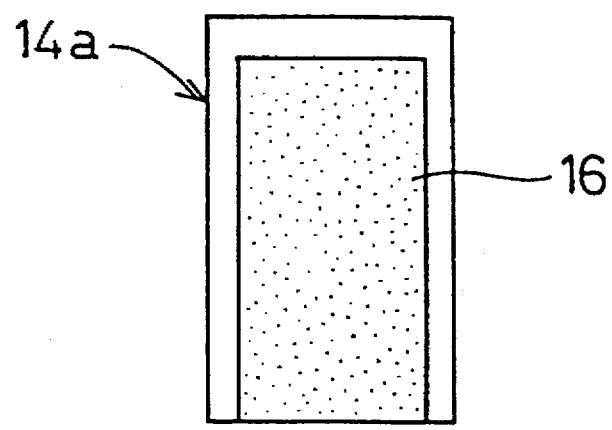
FIG. 2 is a plan view illustrating one embodiment of the first dielectric ceramic layer to be laminated.
Figure 3:
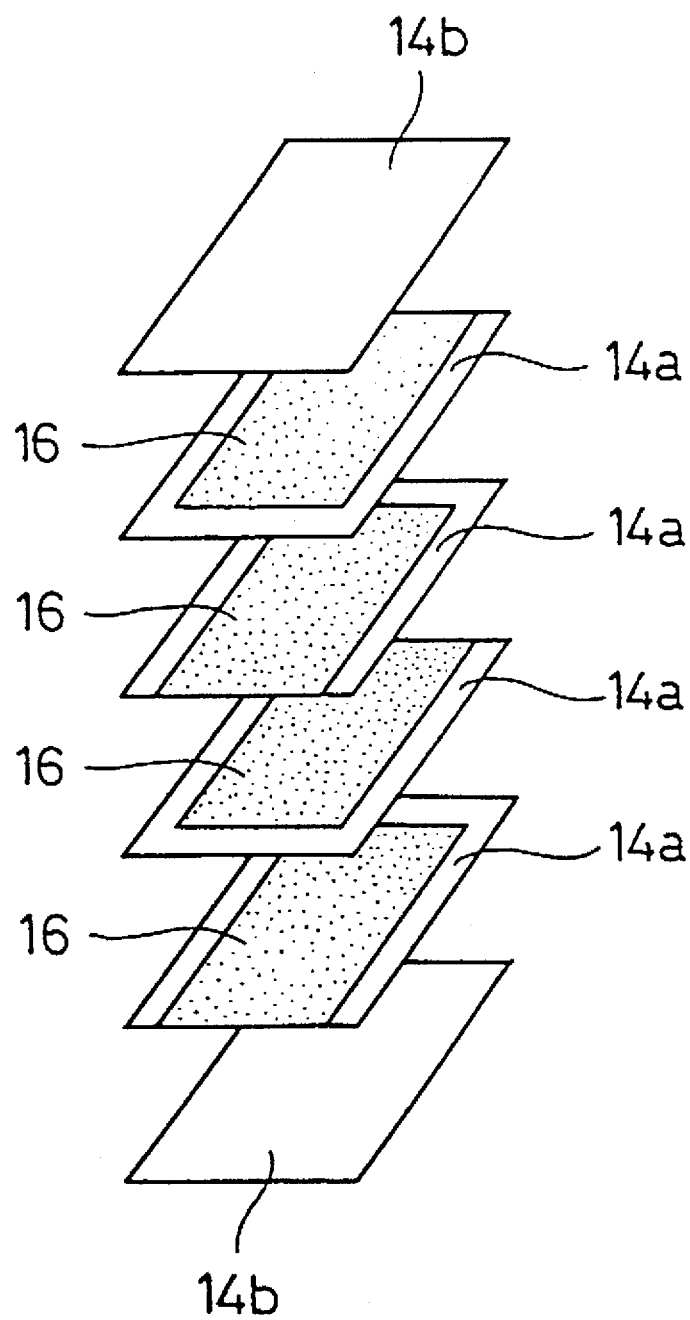
FIG. 3 is a perspective, exploded view illustrating the lamination of first dielectric ceramic layers and second dielectric ceramic layers to construct the monolithic dielectric ceramic body to be in the capacitor of the invention.

First, the monolithic dielectric ceramic body 12 is produced as follows. As in FIG. 2, a raw material powder comprising barium titanate, and one or more rare earth oxides selected from yttrium oxide, terbium oxide, dysprosium oxide, holmium oxide, erbium oxide and ytterbium oxide, and manganese oxide, cobalt oxide, nickel oxide, and an oxide consisting essentially of $Li_2O-B_2O_3-(Si,Ti)O_2$ is formed into a slurry, and then sheeted to prepare a first, dielectric ceramic layer 14a (green sheet). On one surface of the green sheet, formed is an internal electrode 16 of nickel or a nickel alloy. To form the internal electrode 16, employable is any method of screen printing, metal vapor deposition or plating. A predetermined number of the first dielectric ceramic layers 14a each with the inner electrode 16 formed thereon are laminated, and then sandwiched between two dielectric ceramic layers 14b with no inner electrode 16, as in FIG. 3, and these are integrated under pressure to give a monolithic laminate. Next, the resulting laminate is baked in a reducing atmosphere at a predetermined temperature to obtain a monolithic dielectric ceramic body 12.

Next, on the both sides of the monolithic dielectric ceramic body 12, formed are two outer electrodes 18 that are connected with the inner electrodes 16. The material of the outer electrodes 18 may be the same as that of the inner electrodes 16. Apart from this, silver, palladium, silver-palladium alloys and others can be used as the material of the outer electrodes 18, to which can be added glass frit, such as glass of the type of $B_2O_3-SiO_2-BaO$ or glass of the type of $Li_2O-SiO_2-BaO$. In consideration of the use of the monolithic ceramic capacitor 10 and the site at which the capacitor 10 is used, suitable materials are selected for the outer electrodes 18. The outer electrodes 18 can be formed by applying a paste material of metal powder onto the baked, monolithic dielectric ceramic body 12 followed by baking it. Alternatively, the paste material can be applied onto the non-baked body 12, which is thereafter baked. After this, the outer electrodes 18 may be plated with nickel, copper or the like to form a first plate film 20a thereon. Last, the first plate film 20a is coated with a second plate film 20b of solder, tin or the like. Thus is produced the chip-type, monolithic ceramic capacitor 10 of the invention.

EMBODIMENTS OF THE INVENTION

Example 1

First, raw materials of $TiCl_4$ and $Ba(NO_3)_2$ having various degrees of purity were prepared and weighed. These were treated with oxalic acid to obtain a precipitate of barium titanyl oxalate ($BaTiO(C_2O_4)108 \cdot 4H_2O$). This precipitate was decomposed under heat at 1000° C. or higher to obtain four types of barium titanate ($BaTiO_3$), as shown in Table 4. On the other hand, oxides, carbonates and hydroxides of the constitutive components were weighed to give a composition of $0.25Li_2O-0.10B_2O_3-0.07TiO_2\cdot-0.58SiO_2$ (by mol), then mixed, ground, and vaporized to dryness to obtain a powder. This powder was melted under heat at 1300° C. in an alumina crucible, and then rapidly cooled to obtain a oxide powder having a mean grain size of 1 μm or less.

TABLE 1

| Type of $BaTiO_3$ | Content of Impurities (wt. %) | | | | | Mean Grain Size (μm) |
| --- | --- | --- | --- | --- | --- | --- |
| | Alkali Metal Oxides | SrO | CaO | $SiO_2$ | $Al_2O_3$ | |
| A | 0.003 | 0.012 | 0.001 | 0.010 | 0.005 | 0.60 |
| B | 0.020 | 0.100 | 0.003 | 0.019 | 0.008 | 0.56 |
| C | 0.012 | 0.179 | 0.018 | 0.155 | 0.071 | 0.72 |
| D | 0.062 | 0.014 | 0.001 | 0.019 | 0.004 | 0.58 |

Next, prepared were $BaCO_3$, which is to adjust the molar ratio, m, of Ba/Ti in the barium titanate, and $Y_2O_3$, $Tb_2O_3$, $Dy_2O_3$, $Ho_2O_3$, $Er_2O_3$, $Yb_2O_3$, MnO, NiO, CoO and MgO each having a purity of 99% or more. Powders of these raw materials were mixed with the oxide powder prepared above, at various compositional ratios as shown in Table 2 to prepare various compositions. Each composition was wet-milled in a ball mill along with a polyvinyl butyral binder and an organic solvent such as ethanol to obtain a ceramic slurry. This ceramic slurry was sheeted according to doctor blading to obtain a rectangular, ceramic green sheet having a thickness of 11 μm. Next, an electroconductive paste consisting essentially of Ni was printed on this ceramic green sheet to form thereon an electroconductive paste layer, which is formed into an inner electrode.

A plurality of these ceramic green sheets each having the electroconductive paste layer formed thereon were laminated in such a manner that the side of one sheet with the electroconductive paste exposed out of it was alternated with that of another sheet with the electroconductive paste not exposed out of it. Thus was obtained a laminate. This laminate was heated in an $N_2$ atmosphere at 350° C. whereby the binder was burnt out, and then baked for 2 hours in a reducing atmosphere comprising gases of $H_2$, $N_2$ and $H_2O$ and having an oxygen partial pressure of from $10^{-12}$ to $10^{-9}$ MPa, at various temperatures shown in Table 3, to obtain sintered ceramic bodies.

TABLE 2

| Sample No. | Type of $BaTiO_3$ | $(1-\alpha-\beta)\{BaO\}_m \cdot TiO_2 + \alpha Re_2O_3 + \beta(Mn_{1-x-y}Ni_xCo_y)O$ | | | | | | | | | | | | | Amount of Oxide Glass Added (wt. pts.) |
| --- | --- | --- | --- | --- | --- | --- | --- | --- | --- | --- | --- | --- | --- | --- | --- |
| | | α | | | | | | | β | x | y | β/α | m | MgO | |
| | | $Y_2O_3$ | $Tb_2O_3$ | $Dy_2O_3$ | $Ho_2O_3$ | $Er_2O_3$ | $Yb_2O_3$ | Total α | | | | | | | |
| *1 | A | — | — | — | — | — | — | 0.000 | 0.01 | 0.2 | 0.6 | — | 1.01 | 1.00 | 0.50 |
| *2 | A | — | — | 0.010 | — | 0.0025 | — | 0.0125 | 0.00 | — | — | 0 | 1.01 | 1.00 | 0.50 |
| *3 | A | — | — | 0.010 | — | 0.0025 | — | 0.0125 | 0.01 | 0.2 | 0.6 | 4/5 | 0.990 | 1.00 | 0.50 |
| *4 | A | 0.0125 | — | — | — | — | — | 0.0125 | 0.01 | 0.2 | 0.6 | 4/5 | 1.000 | 1.00 | 0.50 |
| *5 | A | — | 0.0075 | 0.0050 | — | — | — | 0.0125 | 0.0125 | 0.2 | 0.6 | 1 | 1.01 | 0 | 0.50 |
| *6 | A | — | — | 0.010 | — | — | — | 0.010 | 0.01 | 0.2 | 0.6 | 1 | 1.01 | 1.0 | 0.00 |
| 7 | A | — | — | 0.0025 | — | — | — | 0.0025 | 0.0025 | 0.2 | 0.2 | 1 | 1.005 | 0.5 | 0.2 |
| 8 | A | 0.005 | 0.005 | — | — | — | — | 0.010 | 0.012 | 0.5 | 0.3 | 6/5 | 1.010 | 1.0 | 0.8 |
| 9 | A | — | — | 0.0075 | — | — | 0.005 | 0.0125 | 0.0075 | 0.0 | 0.9 | 5/3 | 1.010 | 2.0 | 0.8 |
| 10 | A | — | 0.001 | 0.008 | — | — | — | 0.009 | 0.010 | 0.2 | 0.6 | 10/9 | 1.015 | 1.5 | 1.0 |
| 11 | A | 0.004 | — | — | 0.004 | — | — | 0.008 | 0.008 | 0.9 | 0.0 | 1 | 1.01 | 1.5 | 1.0 |
| 12 | C | — | — | 0.015 | 0.010 | — | — | 0.025 | 0.05 | 0.6 | 0.3 | 2 | 1.005 | 1.0 | 2.0 |
| 13 | B | — | — | — | — | 0.003 | — | 0.003 | 0.003 | 0.4 | 0.2 | 1 | 1.01 | 3.0 | 3.0 |
| 14 | A | — | — | 0.01 | — | — | — | 0.01 | 0.005 | 0.0 | 0.0 | 1/2 | 1.01 | 1.0 | 1.0 |
| 15 | A | 0.006 | — | — | — | — | — | 0.006 | 0.024 | 0.2 | 0.6 | 4 | 1.035 | 0.1 | 1.5 |
| 16 | A | 0.012 | — | 0.008 | — | — | — | 0.020 | 0.004 | 0.1 | 0.1 | 1/5 | 1.015 | 2.0 | 1.0 |
| *17 | A | — | — | — | 0.01 | — | 0.02 | 0.03 | 0.015 | 0.2 | 0.4 | 2.0 | 1.01 | 2.0 | 1.0 |
| *18 | A | — | — | 0.01 | 0.01 | — | — | 0.02 | 0.08 | 0.2 | 0.4 | 4.0 | 1.01 | 1.0 | 0.8 |
| *19 | A | — | — | 0.01 | — | — | — | 0.01 | 0.01 | 1.0 | — | 1.0 | 1.01 | 1.0 | 0.5 |
| *20 | A | — | — | 0.01 | — | — | — | 0.01 | 0.01 | — | 1.0 | 1.0 | 1.01 | 1.0 | 0.5 |
| *21 | A | — | — | 0.005 | — | — | — | 0.005 | 0.05 | 0.2 | 0.4 | 10 | 1.01 | 1.0 | 0.5 |
| *22 | A | — | — | 0.01 | — | — | — | 0.01 | 0.005 | 0.2 | 0.4 | 1/2 | 1.05 | 1.0 | 1.0 |
| *23 | A | — | — | 0.01 | — | — | — | 0.01 | 0.005 | 0.2 | 0.4 | 1/2 | 1.01 | 5.0 | 1.5 |
| *24 | A | — | — | 0.01 | — | — | — | 0.01 | 0.005 | 0.2 | 0.4 | 1/2 | 1.01 | 1.0 | 5.0 |
| *25 | D | — | — | 0.01 | — | — | — | 0.01 | 0.005 | 0.2 | 0.4 | 1/2 | 1.01 | 1.0 | 0.8 |

Samples with * are outside the invention.

TABLE 3

| Sample No. | Baking Temperature (°C.) | Dielectric Constant, ε | Dielectric Loss, tan δ (%) | Temperature-Dependent Variation in Capacitance, ΔC/C$_{20}$ (%) | | Temperature-Dependent Variation in Capacitance, ΔC/C$_{25}$ (%) | | | CR (MΩ·μF), 2.0 KV/mm Applied | | CR (MΩ·μF), 20 KV/mm Applied | | Mean Life Time (hr.) | Grain Size (μm) |
|---|---|---|---|---|---|---|---|---|---|---|---|---|---|---|
| | | | | −25° C. | 85° C. | −55° C. | 125° C. | max | 25° C. | 125° C. | 25° C. | 125° C. | | |
| *1 | 1280 | 2730 | 2.4 | −10.1 | −2.3 | −15.6 | 4.1 | 15.6 | 7910 | 1650 | 6800 | 150 | 5 | 0.88 |
| *2 | 1280 | As semiconductors were formed, the measurement was impossible. | | | | | | | | | | | | 2.0 |
| *3 | 1280 | As semiconductors were formed, the measurement was impossible. | | | | | | | | | | | | 1.6 |
| *4 | 1280 | 3350 | 1.9 | −3.4 | −4.9 | −5.8 | −2.6 | 5.8 | 4270 | 660 | 580 | 90 | 121 | 0.72 |
| *5 | 1280 | 3310 | 1.8 | −1.2 | −9.2 | −0.2 | −15.3 | 15.3 | 6330 | 2150 | 1670 | 120 | 383 | 0.76 |
| *6 | 1350 | As the sample was sintered insufficiently, the measurement was impossible. | | | | | | | | | | | | 0.61 |
| 7 | 1300 | 4030 | 2.4 | −6.3 | −6.6 | −9.1 | −12.5 | 12.5 | 7420 | 5190 | 4770 | 550 | 516 | 0.70 |
| 8 | 1280 | 3390 | 1.9 | −2.0 | −5.2 | −2.3 | −6.8 | 7.0 | 6450 | 2850 | 2890 | 620 | 620 | 0.69 |
| 9 | 1300 | 3120 | 1.8 | −1.2 | −7.3 | −1.4 | −8.4 | 8.4 | 6120 | 2990 | 2540 | 780 | 635 | .069 |
| 10 | 1280 | 3410 | 1.9 | −0.8 | −6.5 | −1.3 | −7.4 | 7.6 | 6370 | 3120 | 2680 | 800 | 679 | 0.70 |
| 11 | 1280 | 3470 | 1.9 | −1.3 | −5.5 | −1.7 | −6.9 | 6.9 | 6200 | 2560 | 2110 | 590 | 574 | 0.72 |
| 12 | 1300 | 3010 | 1.7 | −2.2 | −4.8 | −2.4 | −4.5 | 5.0 | 6030 | 2770 | 2570 | 760 | 601 | 0.79 |
| 13 | 1260 | 3380 | 2.2 | −5.1 | −5.3 | −7.4 | −11.3 | 11.3 | 7100 | 4340 | 3960 | 570 | 532 | 0.62 |
| 14 | 1280 | 3250 | 1.8 | −0.9 | −6.6 | −1.4 | −7.2 | 7.2 | 6420 | 2620 | 2650 | 850 | 735 | 0.69 |
| 15 | 1300 | 3170 | 1.9 | −2.4 | −5.5 | −2.7 | −6.3 | 6.3 | 6650 | 2170 | 3020 | 590 | 563 | 0.68 |
| 16 | 1300 | 3080 | 1.7 | −1.9 | −5.3 | −1.8 | −4.8 | 5.5 | 6020 | 2070 | 2060 | 680 | 656 | 0.68 |
| *17 | 1360 | 2270 | 1.9 | −2.3 | −4.9 | −2.7 | −3.5 | 5.2 | 2540 | 840 | 890 | 250 | 271 | 0.65 |
| *18 | 1360 | 3010 | 1.9 | −1.1 | −9.4 | −1.2 | −16.0 | 16.0 | 5300 | 380 | 3450 | 80 | 53 | 0.70 |
| *19 | 1280 | 3410 | 2.0 | −1.5 | −5.8 | −0.7 | −6.9 | 6.9 | 2410 | 240 | 930 | 100 | 110 | 0.73 |
| *20 | 1280 | 3290 | 1.8 | −2.0 | −5.4 | −1.3 | −5.7 | 5.7 | 3290 | 270 | 1010 | 140 | 156 | 0.73 |
| *21 | 1280 | 3510 | 2.1 | 1.0 | −10.7 | −0.5 | −17.3 | 17.3 | 6360 | 1690 | 2870 | 280 | 298 | 0.74 |
| *22 | 1360 | As the sample was not sintered, the measurement was impossible. | | | | | | | | | | | | 0.61 |
| *23 | 1360 | 2180 | 1.7 | −1.3 | −2.8 | −2.0 | 4.4 | 4.7 | 6180 | 2220 | 3040 | 570 | 439 | 0.65 |
| *24 | 1200 | 1990 | 1.4 | −0.9 | −2.0 | −1.1 | 5.7 | 5.8 | 5360 | 3470 | 3800 | 1890 | 503 | 0.70 |
| *25 | 1280 | 2530 | 1.4 | −2.4 | −4.7 | −2.8 | −6.1 | 6.1 | 6920 | 2890 | 3560 | 630 | 671 | 0.67 |

Samples with * are outside the invention.

The surface of each sintered ceramic body was observed with a scanning, electronic microscope at a magnification of 1500 times, to determine the grain sizes of the grains seen in the field of view.

A silver paste containing glass frit of the type of $B_2O_3$-$Li_2O$-$SiO_2$-$BaO$ was applied onto the both sides of each sintered ceramic body, and baked again in an $N_2$ atmosphere at 600° C. to thereby form outer electrodes electrically connected with the inner electrodes.

The outer dimension of each of these monolithic capacitors thus obtained was 1.6 mm width×3.2 mm length×1.2 mm thickness, and the thickness of each dielectric ceramic layer sandwiched between the inner electrodes was 8 μm. The total number of the effective dielectric ceramic layers was 19, and the area of the facing electrodes per one ceramic layer was 2.1 mm$^2$.

The electric characteristics of these capacitor samples produced herein were measured. Precisely, the capacitance (C) and the dielectric loss (tan δ) were measured, using an automatic bridge-type meter at a frequency of 1 KHz, at 1 V rms and at 25° C. From the capacitance thus measured, obtained was the dielectric constant (ε) of each sample through calculation. Next, to measure the insulating resistance (R) of each sample, a direct current voltage of 16 V was applied to each sample at 25° C. or 125° C. for 2 minutes, using an insulating resistance meter. After having thus measured the insulating resistance (R) of each sample, the product of the capacitance (C) and the insulating resistance (R) or, that is, the product CR of each sample was obtained. To measure the insulating resistance (R) in the electric field of 20 KV/mm, a direct current voltage of 160 V was applied to each sample for 2 minutes, and the insulating resistance (R) at 25° C. and 125° C. was measured in the same manner, from which the product CR was also obtained. In addition, the temperature-dependent variation in the capacitance of each sample was determined.

For the temperature-dependent variation in the capacitance, obtained were the variation in the capacitance between −25° C. and 85° C. based on the capacitance at 20° C. ($\Delta C/C_{20}$), the variation in the capacitance between −55° C. and 125° C. based on the capacitance at 25° C. ($\Delta C/C_{25}$), and the maximum variation, in terms of the absolute value, between −55° C. and 125° C. (|ΔC|max).

To determine the high-temperature load life of each sample, 36 pieces of each sample were subjected to a high-temperature load test in which a direct current voltage of 100 V was applied to each piece at 150° C., while measuring the insulating resistance of each test piece which varied time-dependently. In this test, the period of time within which the insulating resistance value (R) of each piece being tested reached 10$^6$ Ω or lower was measured and is referred to as the life time of each test piece. The average of all the tested pieces was calculated to obtain the average life time of each sample.

The results obtained in these tests are shown above in Table 3.

As is obvious from Table 1, Table 2 and Table 3, the monolithic capacitor samples falling within the scope of the present invention all were found to have a high dielectric constant of not lower than 3,000, and have a dielectric loss tangent, tan δ, of not larger than 2.5%, while satisfying the B-level characteristic standard stipulated in the JIS Standard within the temperature range between −25° C. and 85° C. and also the X7R-level characteristic standard stipulated in the EIA Standard within the temperature range between −55° C. and 125° C. with respect to the temperature-dependent variation in the capacitance.

Moreover, these samples of the invention were found to have high insulating resistance values, when measured at 25° C. and 125° C. in a high electric field at 20 KV/mm, of not smaller than 2,000 Ω·F and not smaller than 500 Ω·F, respectively, in terms of the product CR. Further, these were found to have a long mean life time of not shorter than 500 hours. In addition, these were sintered at relatively low temperatures of not higher than 1300° C. The crystal grains in the sintered samples were small, having grain sizes of not larger than 1 μm.

The reasons for defining the compositions for use in the present invention are mentioned below.

The reasons for defining the composition of $(1-\alpha-\beta)\{BaO\}_m \cdot TiO_2 + \alpha Re_2O_3 + \beta(Mn_{1-x-y}Ni_xCo_y)O$, in which $Re_2O_3$ is one or more selected from $Y_2O_3$, $Tb_2O_3$, $Dy_2O_3$, $Ho_2O_3$, $Er_2O_3$ and $Yb_2O_3$ are as follows.

If the amount of $Re_2O_3$, α, is smaller than 0.0025, as in Sample No. 1, such is unfavorable, since the dielectric constant ε is lower than 3,000, the temperature-dependent variation in the capacitance is great, the insulating resistance at 125° C. is low irrespective of the intensity of the electric field applied to the sample, and the mean life time is very short. If the amount of $Re_2O_3$, α, is larger than 0.025, as in Sample No. 17, such is also unfavorable, since the dielectric constant is not larger than 3,000, the insulating resistance at 25° C. and 125° C. is low, the mean life time is short, and the sintering temperature is high.

If the amount of (Mn,Ni,Co)O, β, is smaller than 0.0025, as in Sample No. 2, such is unfavorable, since the constitutive ceramics were reduced into semiconductors when baked in the reducing atmosphere, to thereby lower the insulating resistance. If the amount β of (Mn,Ni,Co)O is larger than 0.05, as in Sample No. 18, such is also unfavorable, since the insulating resistance at 125° C. is low irrespective of the intensity of the electric field applied to the sample, the mean life time is short, and the temperature-dependent variation in the capacitance is too large to satisfy the X7R-level characteristic standard of the EIA Standard.

As shown in Sample No. 19 and Sample No. 20, if the amount of NiO, x, and the amount of CoO, y, are 1.0, the insulating resistance at 2.0 KV/mm and at 125° C. is low, the insulating resistance at 20 KV/mm and at 25° C. and 125° C. does not reach 2000 MΩ·μF and 500 MΩ·μF, respectively, and the mean life time is shorter than 500 hours.

As shown in Sample No. 21, if the ratio, β/α, of the amount β of (Mn,Ni,Co)O to the amount α of $Re_2O_3$ is larger than 4, such is unfavorable, since the temperature-dependent variation in the capacitance is large, the insulating resistance at 2.0 KV/mm and 20 KV/mm and at 125° C. does not reach 2000 MΩ·μF and 500 MΩ·μF, respectively, and the mean life time is shorter than 500 hours.

As shown in Sample Nos. 3 and 4, if the molar ratio of barium titanate, m, is not larger than 1.000, such is unfavorable, since the ceramics were converted into semiconductors when baked in the reducing atmosphere to lower the insulating resistance of the capacitor, the insulating resistance at high temperatures in strong electric field conditions is low, and the mean life time is very short. For these reasons, the dielectric layers constituting the samples cannot be thinned. If the molar ratio m is larger than 1.035, as in Sample No. 22, such is also unfavorable, since the sinterability of the sample is very poor.

As shown in Sample No. 5, if the amount of MgO is smaller than 0.1 mols, such is unfavorable, since the insulating resistance at 20 KV/mm is low, the mean life time is shorter than 500 hours, and the temperature-dependent variation in the capacitance could not satisfy the X7R-level characteristic standard of the EIA standard although satisfying the B-level characteristic standard of the JIS Standard. As shown in Sample No. 23, if the amount of MgO is larger than 3.0 mols, such is also unfavorable, since the sintering temperature is too high, the dielectric constant could not be over 3,000, and the mean life time could not be over 500 hours.

If the amount of the oxide of the type of $Li_2O$-$B_2O_3$-(Si,Ti)$O_2$ is smaller than 0.2 parts by weight, as in Sample No. 6, such is unfavorable, since the capacitor could be sintered insufficiently. As shown in Sample No. 24, if the amount of the oxide of the type of $Li_2O$-$B_2O_3$-(Si,Ti)$O_2$ is larger than 3.0 parts by weight, such is also unfavorable, since the dielectric constant could not be over 3000.

As shown in Sample No. 25, if the content of alkali metal oxide impurities in barium titanate is larger than 0.02% by weight, such is unfavorable, since such impurities lower the dielectric constant.

Example 2

Using barium titanate A in Table 1, prepared was a raw material powder to give a dielectric composition of $98.0\{BaO\}_{1.010} \cdot TiO_2 + 0.8Y_2O_3 + 0.2Er_2O_3 + 1.0(Mn_{0.3}Ni_{0.7})O$ (by mol) containing 1.0 mol of MgO. To this was added oxide samples of $Li_2O$-$B_2O_3$-(Si,Ti)$O_2$ having a mean grain size of 1 μm or less, which had been prepared in the same manner as in Example 1 with heating at from 1200° C. to 1500° C. and shown in Table 4. Using these, prepared were monolithic ceramic capacitors each having outer electrodes of silver as electrically connected with inner electrodes, in the same manner as in Example 1. The outer dimension of the monolithic ceramic capacitor samples produced herein was the same as those in Example 1.

TABLE 4

| Sample No. | Amount of Oxide Glass Added (wt. %) | Components of Oxide Glass | | | | Additive Components | |
|---|---|---|---|---|---|---|---|
| | | Essential Components (mol %) | | | | (wt. pts.) | |
| | | $Li_2O$ | $B_2O_3$ | $(Si_wTi_{1-w})O_2$ | w | $Al_2O_3$ | $ZrO_2$ |
| 101 | 1.0 | 0 | 20 | 80 | 0.7 | — | — |
| 102 | 1.0 | 19 | 1 | 80 | 0.7 | — | — |
| 103 | 1.0 | 49 | 1 | 50 | 0.8 | — | — |
| 104 | 1.0 | 45 | 50 | 5 | 0.5 | — | — |
| 105 | 1.0 | 20 | 75 | 5 | 0.4 | — | — |
| 106 | 1.0 | 0 | 80 | 20 | 0.4 | — | — |
| 107 | 1.0 | 35 | 15 | 50 | 0.5 | — | — |
| 108 | 1.0 | 35 | 50 | 15 | 0.9 | — | — |
| 109 | 1.0 | 20 | 40 | 40 | 0.3 | — | — |
| 110 | 1.0 | 10 | 15 | 75 | 0.7 | — | — |
| 111 | 1.0 | 10 | 70 | 20 | 0.4 | 5 | 2 |
| 112 | 1.0 | 35 | 15 | 50 | 0.7 | 15 | 5 |
| 113 | 1.0 | 35 | 15 | 50 | 0.7 | 20 | — |
| 114 | 1.0 | 35 | 15 | 50 | 0.7 | — | 10 |
| *115 | 1.0 | 10 | 5 | 85 | 0.5 | — | — |
| *116 | 1.0 | 55 | 20 | 25 | 0.7 | — | — |
| *117 | 1.0 | 35 | 62 | 3 | 0.7 | — | — |
| *118 | 1.0 | 5 | 85 | 10 | 0.7 | — | — |
| *119 | 1.0 | 10 | 15 | 75 | 0.1 | — | — |
| *120 | 1.0 | 35 | 50 | 15 | 1.0 | — | — |
| *121 | 1.0 | 35 | 50 | 15 | 0.7 | 30 | — |
| *122 | 1.0 | 35 | 50 | 15 | 0.7 | — | 20 |

Samples with * are outside the invention.

The electric characteristics of these samples were measured. The capacitance (C) and the dielectric loss (tan δ) were measured using an automatic bridge-type meter at a frequency of 1 KHz, at 1 V rms and at 25° C. From the capacitance thus measured, obtained was the dielectric constant (ε) of each sample through calculation. Next, to measure the insulating resistance (R) of each sample in an electric field at 20 KV/mm, a direct current voltage of 160 V was applied to each sample at 25° C. or 125° C. for 2 minutes, using an insulating resistance meter. After having thus measured the insulating resistance (R) of each sample, the product of the capacitance (C) and the insulating resistance (R) or, that is, the product CR of each sample was obtained. In addition, the temperature-dependent variation in the capacitance of each sample was determined.

For the temperature-dependent variation in the capacitance, obtained were the variation in the capacitance between −25° C. and 85° C. based on the capacitance at 20° C. ($\Delta C/C_{20}$), the variation in the capacitance between −55° C. and 125° C. based on the capacitance at 25° C. ($\Delta C/C_{25}$), and the maximum variation, in terms of the absolute value, between −55° C. and 125° C. ($|\Delta C|max$).

After the measurement of these data, the samples were plated with nickel over their outer electrodes of silver according to a barrel plating method using a nickel plating bath which comprised nickel sulfate, nickel chloride and boric acid. Last, the samples were further plated with solder over their nickel plate films according to a barrel plating method using a solder plating bath, AS bath (alkanolsulfonic acid bath). Thus were prepared herein monolithic capacitor samples with plated outer electrodes.

The electric characteristics of these capacitor samples produced herein were measured. Precisely, the capacitance (C) was measured using an automatic bridge-type meter at a frequency of 1 KHz, at 1 V rms and at 25° C. Next, to measure the insulating resistance (R) in an electric field at 20 KV/mm, a direct current voltage of 160 V was applied to each sample at 25° C. or 125° C. for 2 minutes, using an insulating resistance meter. After having thus measured the insulating resistance (R) of each sample, the product of the capacitance (C) and the insulating resistance (R) or, that is, the product CR of each sample was obtained.

The results obtained in these tests are shown in Table 5.

As is obvious from Table 4 and Table 5, the monolithic capacitor samples comprising dielectric ceramic layers, to which was added an oxide of the type of $Li_2O$-$B_2O_3$-$(Si,Ti)O_2$ in an amount falling within the scope of the present invention were all found to have a high dielectric constant of not lower than 3,000, and have a dielectric loss tangent, tan $\delta$, of not larger than 2.5%, while satisfying the B-level characteristic standard stipulated in the JIS Standard within the temperature range between −25° C. and 85° C. and also the X7R-level characteristic standard stipulated in the EIA Standard within the temperature range between −55° C. and 125° C. with respect to the temperature-dependent variation in the capacitance. In addition, even though the samples of the invention were plated, their electric characteristics were not deteriorated.

Figure 4:
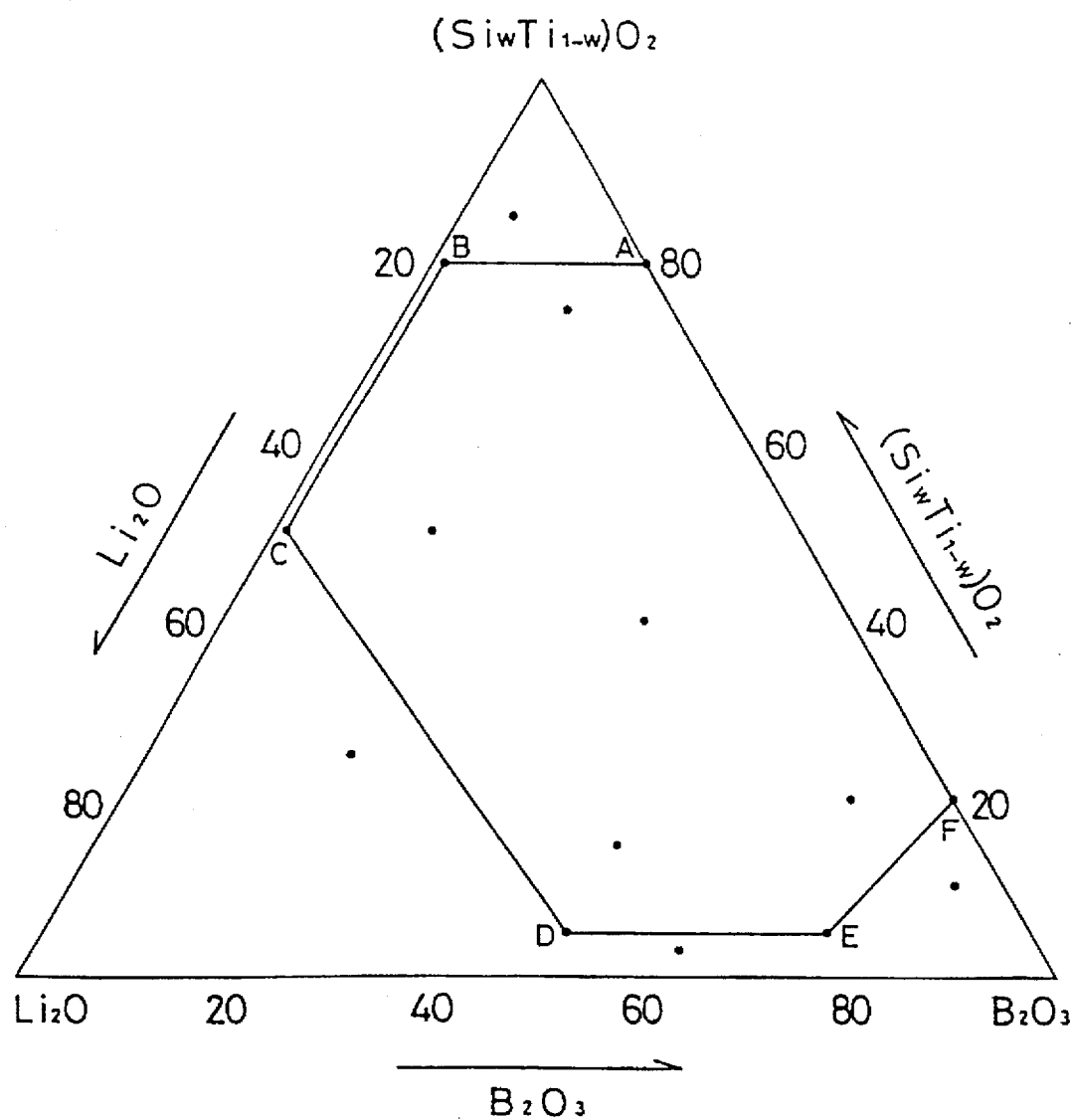
FIG. 4 is a three-component compositional graph for $\{Li_2O, B_2O_3, (Si_wTi_{1-w})O_2\}$, which indicates the compositional range of the oxide additive of $Li_2O-B_2O_3-(Si,Ti)O_2$.

As opposed to the samples of the invention, the other samples, Sample Nos. 115 to 118 which did not fall within the scope of the invention in that the amount of the oxide of $Li_2O$-$B_2O_3$-$(Si,Ti)O_2$ added thereto is without the scope of the compositional range as defined to be surrounded by six points, A, B, C, D, E, F, which are as follows, in a triangular diagram of $\{Li_2O, B_2O_3, (Si_wTi_{1-w})O_2\}$ shown in FIG. 4, in which $0.30 \leq w < 1.0$, were not good, since they could not be sintered well, or even sintered, their insulating resistance was greatly lowered due to plating thereover. Precisely, in FIG. 4 referring to the defined compositional range, the point A indicates a composition comprising 0 mol % of $Li_2O$, 20 mol % of $B_2O_3$, and 80 mol % of $(Si,Ti)O_2$; the point B indicates a composition comprising 19 mol % of $Li_2O$, 1 mol % of $B_2O_3$, and 80 mol % of $(Si,Ti)O_2$; the point C indicates a composition comprising 49 mol % of $Li_2O$, 1 mol % of $B_2O_3$, and 50 mol % of $(Si,Ti)O_2$; the point D indicates a composition comprising 45 mol % of $Li_2O$, 50 mol % of $B_2O_3$, and 5 mol % of $(Si,Ti)O_2$; the point E indicates a composition comprising 20 mol % of $Li_2O$, 75 mol % of $B_2O_3$, and 5 mol % of $(Si,Ti)O_2$; and the point F indicates a composition comprising 0 mol % of $Li_2O$, 80 mol % of $B_2O_3$, and 20 mol % of $(Si,Ti)O_2$.

TABLE 5

| Sample No. | Baking Temperature (°C.) | Dielectric Constant, $\epsilon$ | Dielectric Loss, tan $\delta$ (%) | Temperature-Dependent Variation in Capacitance, $\Delta C/C_{20}$ (%) | | Temperature-Dependent Variation in Capacitance, $\Delta C/C_{25}$ (%) | | | CR After Plated (M$\Omega \cdot \mu$F), 2.0 KV/mm Applied | | CR Before Plated (M$\Omega \cdot \mu$F), 20 KV/mm Applied | |
|---|---|---|---|---|---|---|---|---|---|---|---|---|
| | | | | −25° C. | 85° C. | −55° C. | 125° C. | max | 25° C. | 125° C. | 25° C. | 125° C. |
| 101 | 1280 | 3310 | 1.9 | −0.5 | −6.7 | −0.8 | −8.1 | 8.1 | 2730 | 770 | 2770 | 830 |
| 102 | 1280 | 3270 | 1.9 | −0.2 | −8.0 | −0.1 | −10.2 | 10.3 | 2520 | 750 | 2520 | 750 |
| 103 | 1280 | 3150 | 2.0 | −0.4 | −7.3 | −0.7 | −9.4 | 9.4 | 2460 | 770 | 2460 | 770 |
| 104 | 1260 | 3070 | 1.7 | −1.0 | −5.7 | −1.1 | −5.8 | 5.9 | 2800 | 810 | 2850 | 880 |
| 105 | 1260 | 3020 | 1.5 | −1.2 | −5.1 | −1.3 | −5.2 | 5.2 | 2850 | 850 | 2900 | 920 |
| 106 | 1280 | 3050 | 1.5 | −0.7 | −5.7 | −0.9 | −6.4 | 6.4 | 2690 | 680 | 2870 | 890 |
| 107 | 1280 | 3110 | 1.8 | −0.9 | −6.2 | −1.2 | −6.5 | 6.8 | 2630 | 810 | 2630 | 800 |
| 108 | 1260 | 3060 | 1.6 | −0.7 | −5.7 | −1.0 | −5.7 | 5.9 | 2810 | 860 | 2820 | 870 |
| 109 | 1260 | 3090 | 1.7 | −1.0 | −6.4 | −1.1 | −6.7 | 6.7 | 2750 | 810 | 2750 | 820 |
| 110 | 1280 | 3230 | 1.8 | −0.2 | −7.5 | −0.3 | −9.9 | 9.9 | 2680 | 730 | 2670 | 730 |
| 111 | 1280 | 3040 | 1.6 | −1.0 | −5.8 | −1.4 | −5.7 | 6.0 | 3650 | 1150 | 3640 | 1180 |
| 112 | 1300 | 3070 | 1.7 | −0.5 | −7.4 | −0.6 | −8.8 | 8.9 | 3290 | 1120 | 3290 | 1120 |
| 113 | 1280 | 3020 | 1.6 | −0.3 | −8.2 | −0.1 | −10.7 | 10.7 | 3760 | 1060 | 3760 | 1050 |
| 114 | 1300 | 3010 | 1.5 | −0.6 | −7.0 | −0.8 | −6.9 | 7.1 | 3630 | 1070 | 3610 | 1070 |
| *115 | 1360 | | | As the sample was sintered insufficiently, the measurement was impossible. | | | | | | | | |
| *116 | 1360 | | | As the sample was sintered insufficiently, the measurement was impossible. | | | | | | | | |
| *117 | 1300 | 3050 | 2.1 | −1.9 | −5.0 | −2.3 | −4.8 | 5.3 | 690 | 110 | 2100 | 670 |
| *118 | 1300 | 3010 | 2.2 | −1.8 | −4.6 | −2.4 | −4.3 | 4.8 | 70 | 5 | 2370 | 530 |
| *119 | | | | As the sample was sintered insufficiently, the measurement was impossible. | | | | | | | | |
| *120 | 1260 | 3080 | 1.6 | −0.5 | −5.9 | −0.3 | −6.1 | 6.3 | 120 | 30 | 2850 | 890 |
| *121 | 1360 | | | As the sample was sintered insufficiently, the measurement was impossible. | | | | | | | | |
| *122 | 1360 | | | As the sample was sintered insufficiently, the measurement was impossible. | | | | | | | | |

Samples with * are outside the invention.

However, as in Samples Nos. 119 and 120, even though falling within the defined range as surrounded by such six points, if the amount w of Si is less than 0.3, such is unfavorable, since the sample could not be sintered well; and if the amount w of Si is 1.0, such is also unfavorable, since the insulating resistance of the plated sample at 20 KV/mm was greatly lowered Monolithic capacitors having an insulating resistance of 3000 MΩ·μF and 1000 MΩ·μF at 20 KV/mm and at 25° C. and 125° C., respectively, could be obtained when an oxide of $Li_2O-B_2O_3-(Si,Ti)O_2$ and also $Al_2O_3$ and $ZrO_2$ were added thereto. As shown in Sample Nos. 121 and 122, however, if the amount of $Al_2O_3$ added was over 20 parts by weight or if the amount of $ZrO_2$ added was over 10 parts by weight, such is unfavorable, since the sinterability of the samples is greatly lowered.

In the above-mentioned examples, used was a powder of barium titanate as prepared according to the oxalic acid method but this is not limitative. Apart from this, also employable are powders of barium titanate as prepared according to an alkoxide method or a hydrothermal reaction method. If the latter powders are used, the characteristics of the capacitors may often be improved more than those of the samples as demonstrated in these examples herein. Powders of yttrium oxide, terbium oxide, dysprosium oxide, holmium oxide, erbium oxide, ytterbium oxide, manganese oxide, cobalt oxide, nickel oxide and others were used in these examples, which, however, are not also limitative. Solutions of alkoxides or organic metal compounds for such oxides can also be employed, in place of such oxide powders, without interfering with the characteristics of the capacitors produced, provided that they are formulated to constitute the dielectric ceramic layers falling within the scope of the present invention.

While the invention has been described in detail and with reference to specific embodiments thereof, it will be apparent to one skilled in the art that various changes and modifications can be made therein without departing from the spirit and scope thereof.

What is claimed is:

1. A monolithic ceramic capacitor composed of;

a plurality of superposed dielectric ceramic layers, a plurality of inner electrodes each of which is disposed between adjacent dielectric ceramic layers in such a manner that one end of each inner electrode is exposed at an end of the dielectric ceramic layers, and outer electrodes electrically connected with the exposed inner electrodes, the monolithic ceramic capacitor being characterized in that the dielectric ceramic layers comprises a barium titanate having a content of alkali metal oxide impurities of about 0.02% by weight or less and having the compositional formula:

$(1-\alpha-\beta)\{BaO\}_m \cdot TiO_2 + \alpha Re_2O_3 + \beta(Mn_{1-x-y}Ni_xCo_y)O$ where $Re_2O_3$ is at least one member of the group consisting of $Y_2O_3$, $Tb_2O_3$, $Dy_2O_3$, $Ho_2O_3$, $Er_2O_3$ and $Yb_2O_3$; and $\alpha$, $\beta$, m, x and y are as follows:
$0.0025 \leq \alpha \leq 0.025$
$0.0025 \leq \beta \leq 0.05$
$\beta/\alpha \leq 4$
$0 \leq x < 1.0$
$0 \leq y < 1.0$
$0 \leq x+y < 1.0$
$1.000 < m \leq 1.035$;

magnesium oxide in an amount of from about 0.1 to 3.0 mols in terms of MgO relative to 100 mols of said titanate and from about 0.2 to 3.0 parts by weight, relative to 100 parts by weight of said titanate and magnesium oxide of an optionally $Li_2O$-containing $B_2O_3$-$(Si,Ti)O_2$ oxide; and the inner electrodes being nickel or a nickel alloy.

2. The monolithic ceramic capacitor as claimed in claim 1, wherein said $B_2O_3$-$(Si,Ti)O_2$ oxide has a composition which falls within the area surrounded by six lines formed by connecting six points, represented by mol %, of:

A (0, 20, 80)

B (19, 1, 80)

C (49, 1, 50)

D (45, 50, 5)

E (20, 75, 5)

F (0, 80, 20)

in a triangular phase diagram of $\{Li_2O, B_2O_3, (Si_wTi_{1-w})O_2\}$, in which $0.3 \leq w < 1.02$, and further contains about 20 parts by weight or less, relative to 100 parts by weight of said $Li_2O$, $B_2O_3$, and $(Si_wTi_{1-w})O_2$ components, of at least one of $Al_2O_3$ and $ZrO_2$, provided that the $ZrO_2$ content is about 10 parts by weight or less.

3. The monolithic ceramic capacitor as claimed in claim 2, wherein said ceramic has a grain size of less than about 1 μm.

4. The monolithic ceramic capacitor as claimed in claim 3, wherein $0.008 \leq \alpha \leq 0.02$, $0.003 \leq \beta \leq 0.024$, $\beta/\alpha \leq 2$, $0.1 \leq x \leq 0.9$, $0.1 \leq y < 0.9$, and $1.005 < m \leq 1.015$; said magnesium oxide is in an amount of from about 0.5 to 2 mols in terms of MgO relative to 100 mols of said titanate; and there is from about 0.8 to 2 parts by weight, relative to 100 parts by weight of said titanate and magnesium oxide of the optionally $Li_2O$-containing $B_2O_3$-$(Si,Ti)O_2$ oxide.

5. The monolithic ceramic capacitor as claimed in claim 4, wherein the content of alkali metal oxide impurities is about 0.015% by weight or less, said ceramic has a grain size of less than about 1 μm, and $0.3 \leq w < 1.0$.

6. The monolithic ceramic capacitor as claimed in claim 5 having two separate outer electrodes on the outside surface of the capacitor, each of which is electrically connected to an inner electrode.

7. The monolithic ceramic capacitor as claimed in claim 6, wherein the outer electrodes comprise a sintered layer of an electroconductive metal powder optionally containing a glass frit.

8. The monolithic ceramic capacitor as claimed in claim 7, wherein the outer electrodes are composed of a first sintered layer of an electroconductive metal powder optionally containing a glass frit added thereto, and a second plated layer formed on the first layer.

9. The monolithic ceramic capacitor as claimed in claim 2, wherein $Re_2O_3$ is $Y_2O_3$, $Dy_2O_3$ or $Er_2O_3$.

10. The monolithic ceramic capacitor as claimed in claim 2, wherein $Re_2O_3$ is a combination of two members of said group.

11. The monolithic ceramic capacitor as claimed in claim 2 having two separate outer electrodes on the outside surface of the capacitor, each of which is electrically connected to an inner electrode.

12. The monolithic ceramic capacitor as claimed in claim 11, wherein the outer electrodes comprise a sintered layer of an electroconductive metal powder optionally containing a glass frit.

13. The monolithic ceramic capacitor as claimed in claim 12, wherein the outer electrodes are composed of a first sintered layer of an electroconductive metal powder optionally containing a glass frit added thereto, and a second plated layer formed on the first layer.

14. The monolithic ceramic capacitor as claimed in claim 1 having two separate outer electrodes on the outside surface of the capacitor, each of which is electrically connected to an inner electrode.

15. The monolithic ceramic capacitor as claimed in claim 14, wherein the outer electrodes comprise a sintered layer of an electroconductive metal powder optionally containing a glass frit.

16. The monolithic ceramic capacitor as claimed in claim 15, wherein the outer electrodes are composed of a first sintered layer of an electroconductive metal powder optionally containing a glass frit added thereto, and a second plated layer formed on the first layer.

* * * * *